United States Patent
Hemphill (10) Patent No.: US 9,556,917 B2
(45) Date of Patent: Jan. 31, 2017

(54) FRUSTO-CONICAL DUAL CLUTCH

(71) Applicant: Schaeffler Technologies AG & Co. KG, Herzogenaurach, DE (US)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 48 days.

(21) Appl. No.: 14/628,679

(22) Filed: Feb. 23, 2015

(65) Prior Publication Data

US 2015/0252856 A1    Sep. 10, 2015

Related U.S. Application Data

(60) Provisional application No. 61/948,982, filed on Mar. 6, 2014.

(51) Int. Cl.
| | |
|---|---|
| *F16D 13/26* | (2006.01) |
| *F16D 13/66* | (2006.01) |
| *F16D 21/06* | (2006.01) |
| *F16F 15/30* | (2006.01) |
| *F16F 15/31* | (2006.01) |

(52) U.S. Cl.
CPC ............ *F16D 13/26* (2013.01); *F16D 13/66* (2013.01); *F16D 21/06* (2013.01); *F16F 15/302* (2013.01); *F16D 2021/0684* (2013.01)

(58) Field of Classification Search
CPC .......... F16D 13/26; F16D 13/66; F16D 21/06; F16D 2021/0684; F16D 2021/0607; F16F 15/302; F16F 15/31
See application file for complete search history.

(56) References Cited

U.S. PATENT DOCUMENTS

| | | | |
|---|---|---|---|
| 2,126,760 A | 8/1938 | Eason | |
| 2,136,811 A * | 11/1938 | Burtnett | F16D 21/06 192/105 C |
| 2,247,478 A | 7/1941 | Burtnett | |
| 5,094,329 A | 3/1992 | Maguire | |
| 6,053,296 A | 4/2000 | Lopez | |
| 2004/0187630 A1 | 9/2004 | Jackel et al. | |
| 2012/0325610 A1* | 12/2012 | Krebs | F16D 21/06 192/48.609 |

FOREIGN PATENT DOCUMENTS

KR    100412391 B1    12/2003

* cited by examiner

*Primary Examiner* — Jacob S Scott
*Assistant Examiner* — Tinh Dang
(74) *Attorney, Agent, or Firm* — Simpson & Simpson, PLLC (57) ABSTRACT

A dual clutch having a flywheel comprising an inner conical surface and an outer conical surface, a first clutch comprising a first contact member that is axially movable along an axis relative to first and second transmission-side input shafts for engaging a first conical clutch disc connected to a first input shaft with the inner conical surface of the flywheel, a second clutch comprising a second contact member that is axially movable along the axis relative to the first and second transmission-side input shafts for engaging a second conical clutch disk connected to a second input shaft with the outer conical surface of the flywheel, a mounting means connected to a clutch housing of the dual clutch or to a transmission housing of a motor vehicle transmission, and, actuation means for moving the first clutch and/or the second clutch along the axis.

11 Claims, 6 Drawing Sheets

FRUSTO-CONICAL DUAL CLUTCH

CROSS-REFERENCE TO RELATED APPLICATIONS

This application claims the benefit under 35 U.S.C. §119 (e) of U.S. Provisional Patent Application No. 61/948,982, filed Mar. 6, 2014, which application is incorporated herein by reference in its entirety.

TECHNICAL FIELD

The invention relates to a friction clutch, and in particular, to a dual clutch, and, even more particularly, to a dual clutch having two conical discs engaged on opposite sides of a single flywheel for alternating gears in a transmission.

BACKGROUND

A dual clutch is arranged for coupling an engine-side output shaft to two different transmission input shafts arranged coaxially in relation to each other. A dual clutch has a first clutch and a second clutch, wherein both the first clutch and second clutch have a pressure plate that is axially movable relative to a counter-plate for engaging the clutch with an associated transmission input shaft. In addition, a co-rotating clutch cover is bolted to a second counter-plate which is then bolted to the first counter-plate. Also, an actuation means is axially fixed for moving the first pressure plate and/or the second pressure plate.

Dual clutch transmissions in motor vehicles increase overall performance by reducing the alternating time between gears within a transmission when compared to a single clutch system and increase engine efficiency by being able to more accurately select the appropriate gear within a transmission. Traditional single and double clutch systems use the same axial arrangement between the flywheel and clutch discs. In current dual clutches, the clutch discs are circular plates axially arranged with a flywheel, which is also a circular plate, and must have a greater force of friction between the clutch discs and flywheel than that of a force imparted by the rotational momentum of the flywheel. Conical surfaces can be used as the contact area between the flywheel and clutch discs to take advantage of the rotational forces developed within a clutch assembly. This is disclosed in U.S. Pat. No. 2,247,478 (Burtnett) where a flat, traditional clutch disc engages the flywheel and then a conical shaped clutch engages the first clutch in order to spin both transmission input shafts. Due to the first clutch and second clutch being in close proximity to one another, the heat generation within the clutch assembly could reach a critical level and cause failure of the device. In addition, power transfer to the conical clutch is transmitted from the flat clutch disc, which is still susceptible to slipping due to its means of engagement with the flywheel.

Another version of a conical clutch is described in U.S. Pat. No. 2,126,760 (Eason) where a single clutch system is described. This patented invention includes a single conical clutch within the assembly that is driven by the flywheel and engages a conical surface axially arranged on an output shaft. The conical clutch disc is of spoked construction to allow for airflow through the clutch disk to prevent overheating. This spoked design arguably improves cooling of the clutch disk, but it limits the performance of the clutch disk due to a decrease in structural strength and prevents the assembly from being used in high load situations where cooling of the assembly would be a major concern.

Clutch discs are designed from low density, high strength material and contain the least amount of material possible to reduce their rotational inertia. A major downside of this design is that with a lighter clutch disc, there is less material to absorb and dissipate the heat generated by the engaging and disengaging of the clutch discs with the flywheel. This generation of heat can be detrimental to the operating efficiency of the dual clutch and lead to mechanical failure due to expansion and fatigue of major components including the flywheel, pressure plates, and clutch discs. To increase the safety factor of the major components, these parts are cast from cast iron, high strength steel, or aluminum due to these materials' superior heat dissipation properties and high strength. Cast iron, which is a less expensive and popular casting material for flywheels, is dense and heavy which increases the chance of slip between the clutch discs and flywheel due to the high rotational inertia generated.

Thus, there has been a long-felt need for a dual clutch, and, even more particularly, for a dual clutch having two conical discs engaged on opposite sides of a single flywheel for alternating gears in a transmission. There has also been a long-felt need for a flywheel having a base and a frusto-conical member emanating from and extending upwardly from the base.

SUMMARY

The present invention broadly includes a dual clutch for engaging an engine-side output shaft to either a first transmission-side input shaft or a second transmission-side input shaft, the dual clutch comprising a flywheel comprising an inner conical surface and an outer conical surface, a first clutch comprising a first contact member that is axially movable along an axis relative to the first and second transmission-side input shafts for engaging a first conical clutch disc connected to a first input shaft with the inner conical surface of the flywheel, a second clutch comprising a second contact member that is axially movable along the axis relative to the first and second transmission-side input shafts for engaging a second conical clutch disk connected to a second input shaft with the outer conical surface of the flywheel, a mounting means connected to a clutch housing of the dual clutch or to a transmission housing of a motor vehicle transmission, and, an actuation device fastened to the mounting means and operatively arranged to move the first clutch and/or the second clutch along the axis.

The invention also comprises a flywheel, comprising a base and a frusto-conical member emanating from and extending upwardly from the base.

The invention also comprises a flywheel, comprising a base having a first side and a second side opposite to the first side, a first contact member operatively arranged to engage a first clutch wherein the first contact member is non-coplanar with the flywheel, and, a second contact member operatively arranged to engage a second clutch wherein the second contact member is non-coplanar with the flywheel.

A general object of the invention is to provide a dual clutch which performs the same function as prior dual clutches but with fewer component parts, and minimizes the generation of heat.

A further object of the invention is to provide a cost savings for the manufacturing and production of a dual clutch.

Another object of the invention is to provide a dual clutch that has the same performance as prior dual clutches but with smaller contact surfaces between axially arranged components.

These and other objects, features and advantages of the present invention will become readily apparent upon a reading and review of the following detailed description of the invention, in view of the appended drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein describes particular aspects only, and is not intended to limit the scope of the present invention as claimed.

Unless defined otherwise, all technical and scientific terms used herein have the same meaning as commonly understood to one of ordinary skill in the art to which this invention pertains. It should be understood that any methods, devices or materials similar or equivalent to those described herein could be used in the practice or testing of the invention.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

Figure 1A:
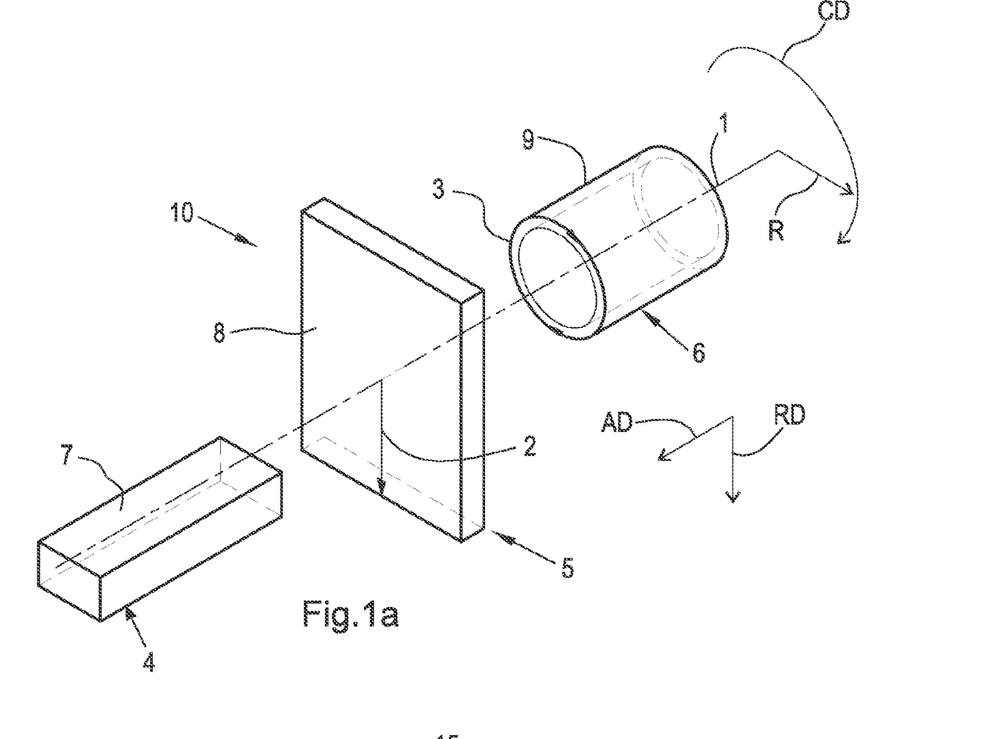
FIG. 1a is a perspective view of a cylindrical coordinate system demonstrating spatial terminology used in the present patent.

FIG. 1a is a perspective view of cylindrical coordinate system 10 demonstrating spatial terminology used in the present patent. The present invention is at least partially described within the context of cylindrical coordinate system 10. System 10 has a longitudinal axis 1, used as the reference for the directional and spatial terms that follow. Axial direction AD is parallel to axis 1. Radial direction RD is orthogonal to axis 1. Circumferential direction CD is defined by an endpoint of radius R (orthogonal to axis 1) rotated about axis 1.

To clarify the spatial terminology, objects 4, 5, and 6 are used. Surface 7 of object 4 forms an axial plane. For example, axis 1 is congruent with surface 7. Surface 8 of object 5 forms a radial plane. For example, radius 2 is congruent with surface 8. Surface 9 of object 6 forms a circumferential surface. For example, circumference 3 is congruent with surface 9. As a further example, axial movement or disposition is parallel to axis 1; radial movement or disposition is orthogonal to axis 2, and circumferential movement or disposition is parallel to circumference 3. Rotation is described herein with respect to axis 1.

The adverbs "axially," "radially," and "circumferentially" are used with respect to an orientation parallel to axis 1, radius 2, or circumference 3, respectively. The adverbs "axially," "radially," and "circumferentially" are also used with respect to orientation parallel to respective planes.

Figure 1B:
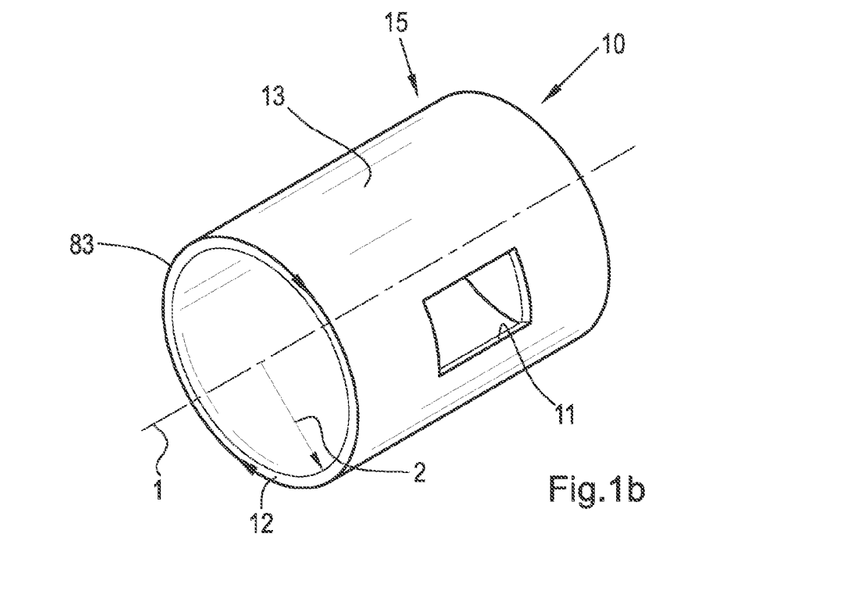
FIG. 1b is a perspective view of an object in the cylindrical coordinate system of FIG. 1a demonstrating spatial terminology used in the present patent.

FIG. 1b is a perspective view of object 15 in cylindrical coordinate system 10 of FIG. 1a demonstrating spatial terminology used in the present patent. Cylindrical object 15 is representative of a cylindrical object in a cylindrical coordinate system and is not intended to limit the claims of the present invention in any manner. Object 15 includes axial surface 11, radial surface 12, and circumferential surface 13. Surface 11 is part of an axial plane; surface 12 is part of a radial plane, and surface 13 is part of a circumferential plane.

Figure 2:
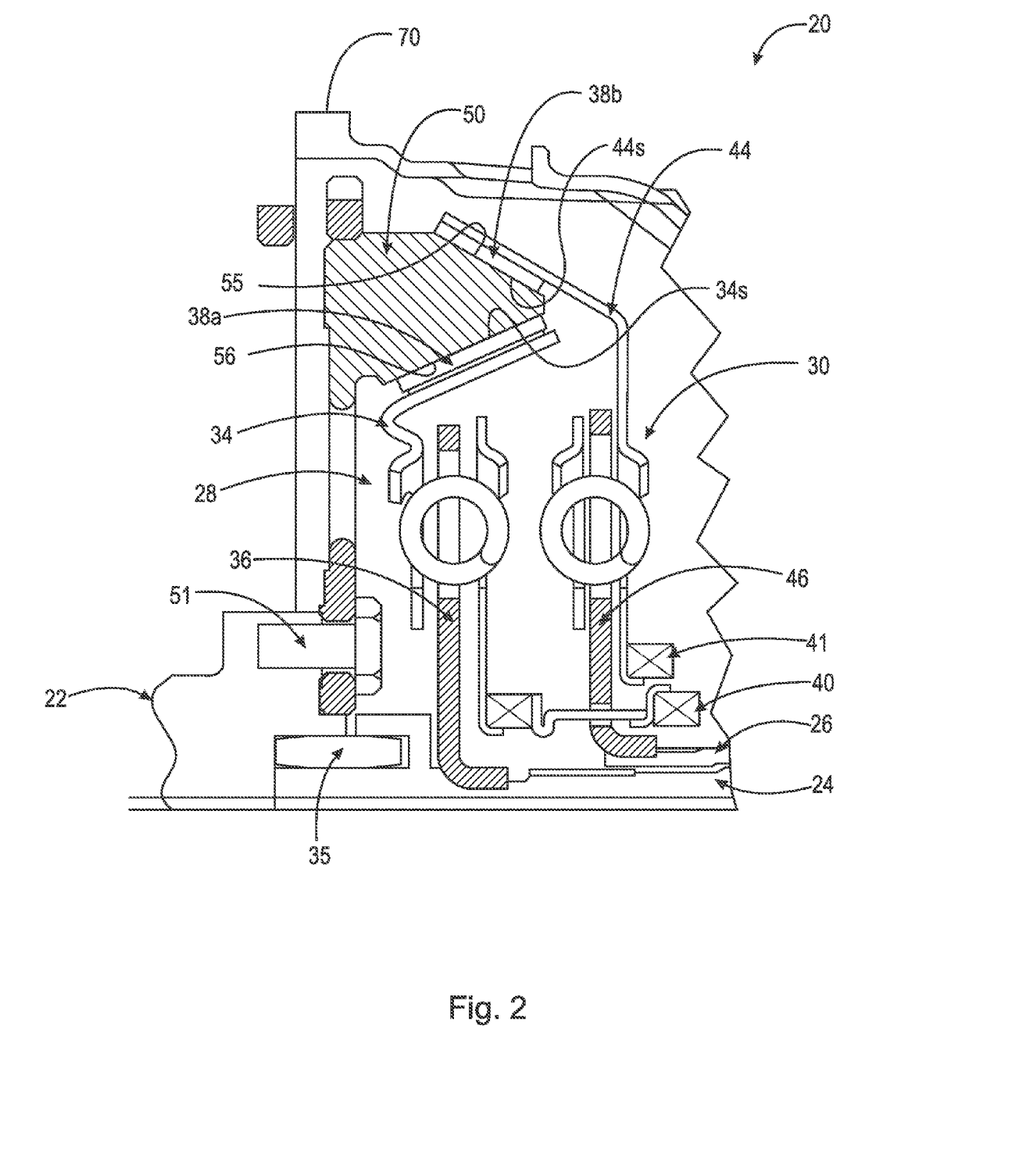
FIG. 2 is a cross-sectional view of a dual clutch transmission including a frusto-conical flywheel.

A dual clutch 20 shown in FIG. 2 engages an engine output shaft 22 with an inner, first transmission input shaft 24 and/or an outer second transmission input shaft 26 arranged to be coaxial with the first transmission input shaft 24. Dual clutch 20 comprises a first clutch 28 and a second clutch 30. First clutch 28 has a first contact member 34 which comprises friction lining 38a that is axially movable relative to a flywheel 50 to engage in a friction lock via surface 34s and inner conical surface 56 with a first clutch disc 36 arranged between flywheel 50 and second clutch 30. Flywheel 50 comprises outer conical surface 55, which will engage surface 44s of friction lining 38b and inner conical surface 56 which will engage surface 34s of friction lining 38a. First clutch disc 36 connects in a non-rotatable but axially movable manner to first transmission input shaft 24. Correspondingly, second clutch 30 has a second contact member 44 that is axially shiftable relative to flywheel 50 to engage in a friction lock via outer conical surface 55 and surface 44s with second clutch disc 46 arranged between first clutch disc 36 and second transmission input shaft 26. Second clutch disc 46 connects in a non-rotatable but axially movable manner to second transmission input shaft 26. First actuation means 40 is fixedly secured to first clutch disc 36 in order to engage and disengage first contact member 34 with flywheel 50. In addition, second actuation means 41 is fixedly secured to second clutch disc 46 in order to engage and disengage second contact member 44 with flywheel 50. First actuation means 40 and second actuation means 41 can be mounted to clutch housing 70 or to a transmission housing of a motor vehicle transmission. In an example embodiment, first actuation means 40 and second actuation means 41 can be hydraulic motors. It should be appreciated, however, that other actuation means are possible and considered to be within the scope of the invention as claimed. For example, an electric motor can be used in place of the hydraulic motor as long as sufficient force can be achieved.

Figure 3:
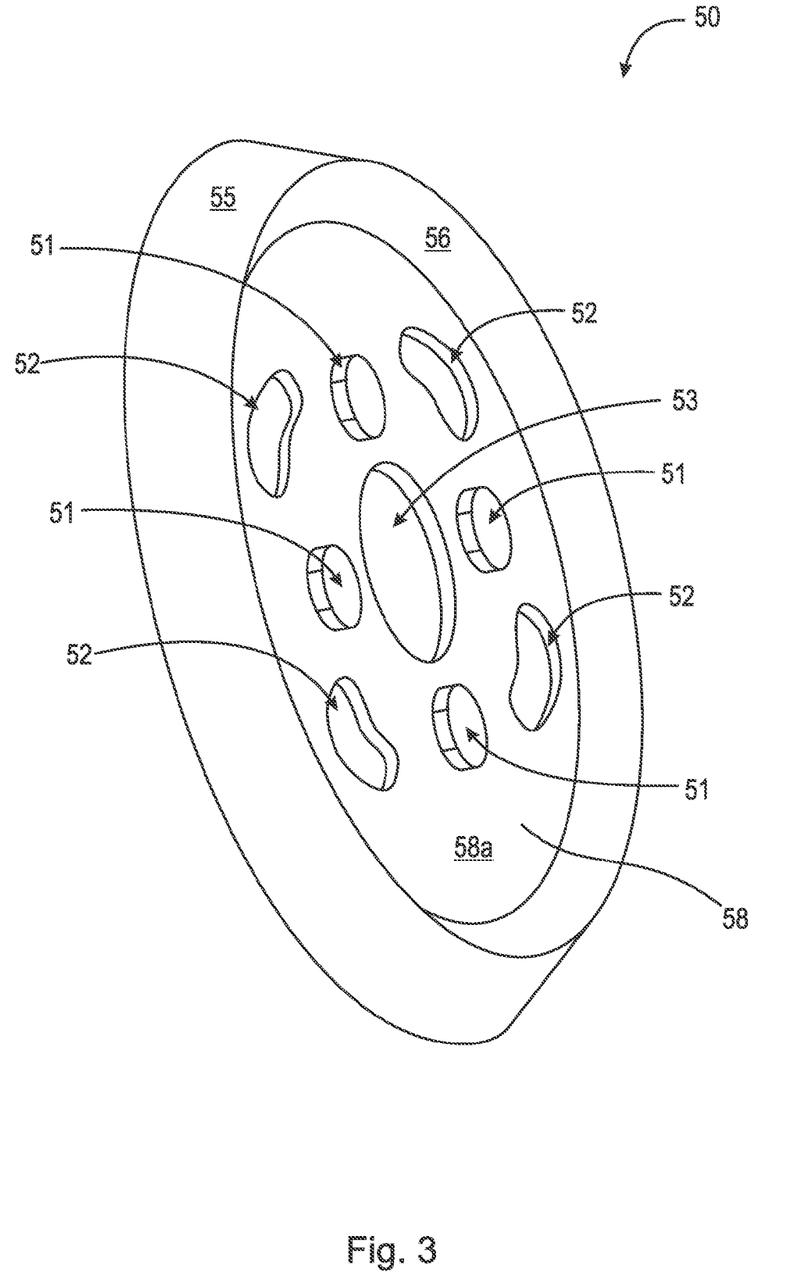
FIG. 3 is a perspective view of a flywheel comprising two conical contact surfaces.
Figure 4A:
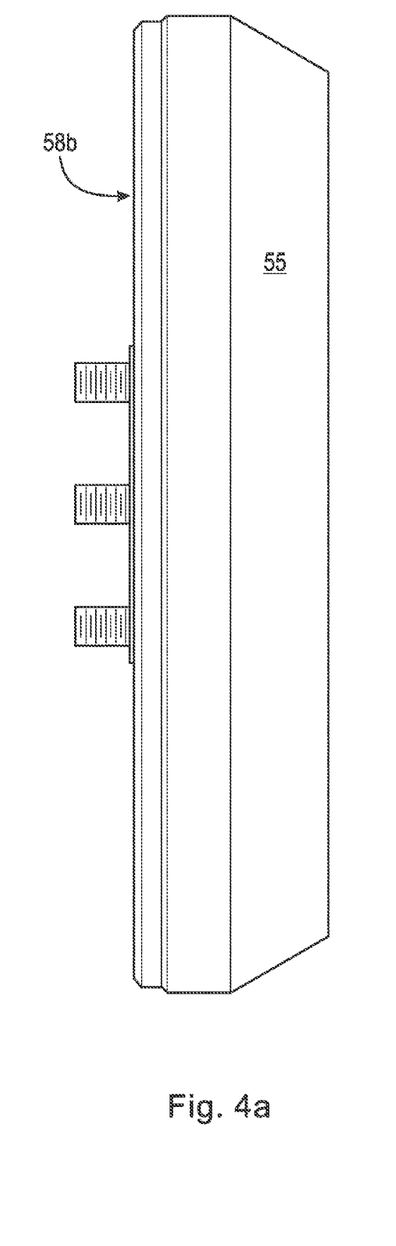
FIG. 4a is a side view of a flywheel comprising two conical contact surfaces.

Flywheel 50 shown in FIG. 3 includes two separate and distinct contact surfaces. Outer conical surface 55 and inner conical surface 56 are arranged on first side 58a of base 58 to engage first contact member 34 and second contact member 44 within dual clutch 20 (shown in FIG. 2). In order to dissipate heat generated by the engaging and disengaging of first clutch 28 and second clutch 30 and to reduce the rotational inertia of flywheel 50, a plurality of apertures 52 are formed within base 58 of flywheel 50. In addition, aperture 53 is arranged in the center of base 58 to allow for mounting transmission input shaft 24 on second side 58b (shown in FIG. 4a) into engine output shaft 22 with bearing 35 arranged between engine output shaft 22 and transmission input shaft 24 (shown in FIG. 2). Flywheel 50 engages engine output shaft 22 via mounting bolts 51 symmetrically arranged on base 58. In addition, outer conical surface 55 and inner conical surface 56 have equal surface areas to make flywheel 50 more stable while rotating at high rotational speeds.

Figure 4B:
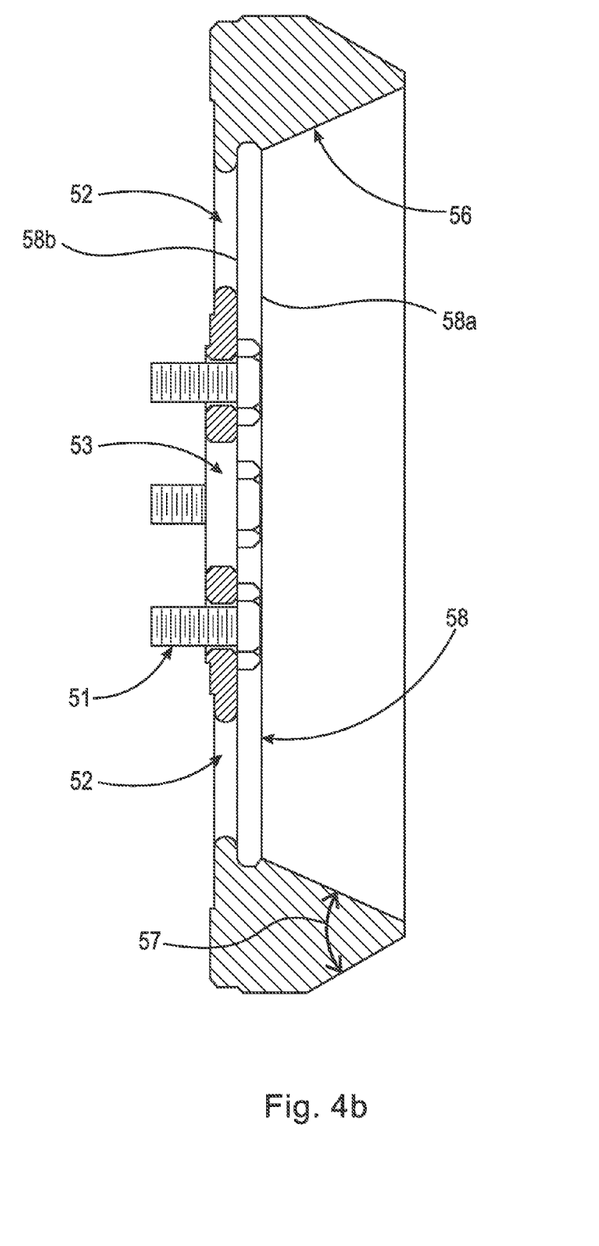
FIG. 4b is a cross-sectional side view of a flywheel comprising two conical contact surfaces.

In an example embodiment, cone angle 57 between outer conical surface 55 and inner conical surface 56 is preferably about 50 degrees as shown in the cross-sectional view of flywheel 50 in FIG. 4b. It should be appreciated, however, that other angles are possible and considered to be within the scope of the invention as claimed. For example, cone angles in the range of 30 to 60 degrees are possible, and angles even outside of this range would also be possible. In addition, the alignment of apertures 52, aperture 53, and mounting bolts 51 is such a way to reduce excessive rotational inertia but not to weaken the strength of flywheel 50.

Figure 5A:
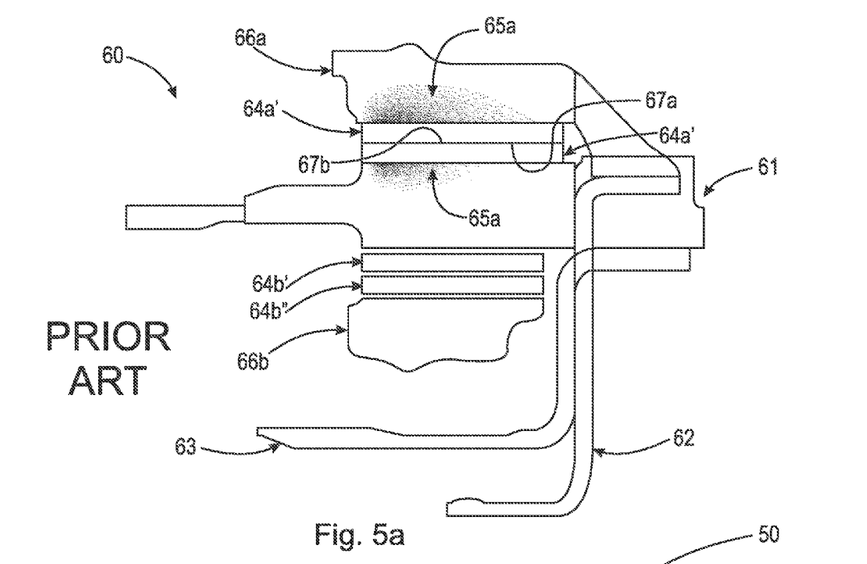
FIG. 5a is cross-sectional view of a traditional dual clutch showing heat energy generated from an engaged clutch disc.

FIG. 5a is an enlarged cross-sectional view of a traditional dual clutch 60, which view has been enhanced to display information relative to how applied stresses will affect the material or design as determined by Finite Element Analysis (FEA). As is well known, FEA is an analysis method typically implemented by software to analyze a material or object. The analysis is done by creating a mesh of points in the shape of the object that contains information about the material and object at each point for analysis. In addition to determining the reaction to stress applied to an object, FEA can also analyze the effect of vibrations, fatigue, and heat transfer. In the description that follows it should be appreciated that areas 65a, 65b, 65c, and 65d of the drawings are intended to denote heat transfer that results from operation of dual clutch 20 and dual clutch 60.

Dual clutch 60 comprises clutch disc 66a, clutch disc 66b, pressure plate 61, actuator member 62, and actuator member 63. Friction lining 64a' and friction lining 64a" are arranged between clutch disc 66a and pressure plate 61 to increase the friction coefficient and to prevent unnecessary wear to clutch disk 66a or pressure plate 61. In addition, friction lining 64b' and friction lining 64b" are arranged between clutch disc 66b and pressure plate 61 to increase the friction coefficient and to prevent unnecessary wear to clutch disk 66a or pressure plate 61. Actuator member 62 engages clutch disc 66a in order to engage and disengage clutch disc 66a with pressure plate 61. In addition, actuator member 63 engages pressure plate 61 in order to engage and disengage pressure plate 61 with clutch disc 66b. As seen in FIG. 5a using FEA, when clutch disc 66a engages pressure plate 61 along surface 67a and surface 67b, heat transfer 65a is excessive within clutch disc 66a. If the heat energy of heat transfer 65a were to exceed a certain level within pressure plate 61 or clutch disc 66a, catastrophic failure could occur within dual clutch 60 due to an expansion of materials when heated. In addition, an increase in operating heat of clutch disc 66a would lead to decreased performance due to friction loss between surface 67a and surface 67b and a decrease in operating life of clutch disc 66a due to excessive wear and fatigue.

Figure 5B:
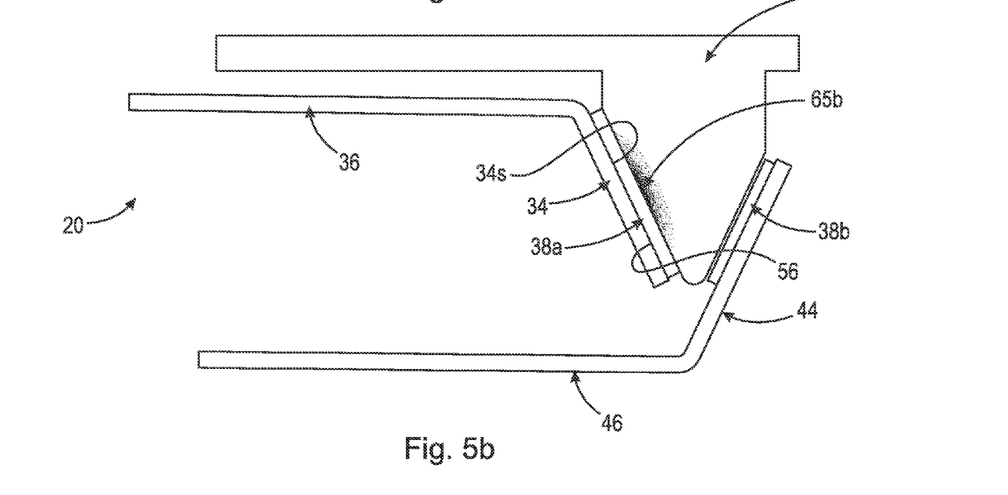
FIG. 5b is a cross-sectional view of a dual clutch with a frusto-conical flywheel showing heat energy generated from an engaged clutch disc.

An enlarged cross-sectional view of dual clutch 20 is shown in FIG. 5b utilizing FEA. As shown in the figure, first contact member 34 engages flywheel 50 along surface 34s and inner conical surface 56 as first clutch disc 36 axially moves towards flywheel 50. During operation, heat transfer 65b generates between first contact member 34 and flywheel 50. Heat transfer 65b is seen to be much less within flywheel 50 when compared to heat transfer 65a (shown in FIG. 5a). Due to an increase of material at the point of engagement between first contact member 34 and flywheel 50 along surface 34s and inner conical surface 56, heat transfers more easily and dissipates throughout flywheel 50. In addition, first contact member 34 has less thickness than clutch disc 66a (shown in FIG. 5b) which helps prevent a buildup of heat within first contact member 34. It is important to note that first contact member 34 and second contact member 44 will not engage with flywheel 40 simultaneously, which could lead to excessive heat energy build-up.

Figure 6A:
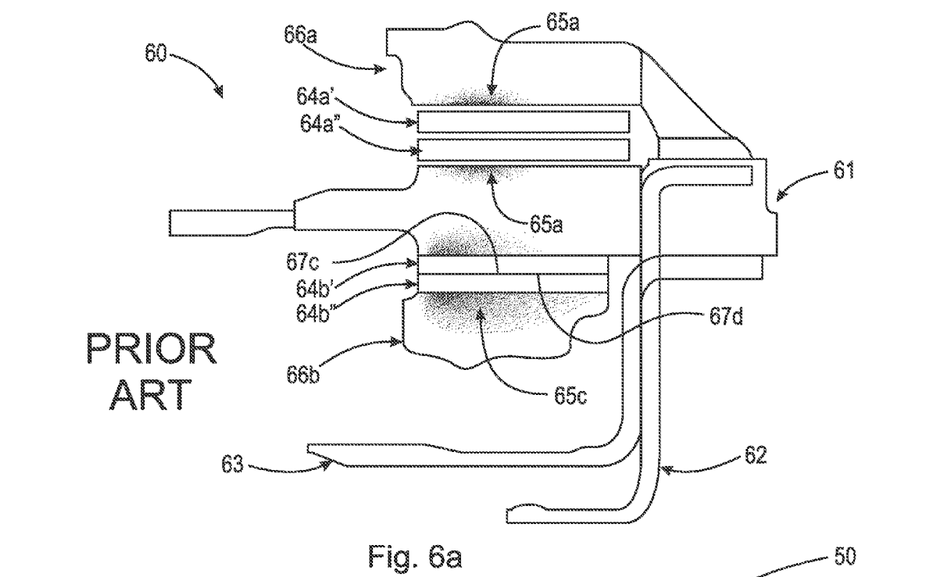
FIG. 6a is a cross-sectional view of a traditional dual clutch showing heat energy generated from an engaged clutch disc and residual heat energy from a previously engaged clutch disc; and, FIG. 6b is a cross-sectional view of a dual clutch with a frusto-conical flywheel showing heat energy generated from an engaged clutch disc and residual heat energy from a previously engaged clutch disc.

FIG. 6a is an enlarged cross-sectional view of a traditional dual clutch 60 while also utilizing FEA. As seen in the figure, when clutch disc 66b engages pressure plate 61 along surface 67c and surface 67d, heat transfer 65c generates within clutch disc 66b. If the heat energy illustrated by heat transfer 65c were to exceed a certain level within pressure plate 61 or clutch disc 66b, catastrophic failure could occur within dual clutch 60 due to an expansion of materials when heated. Adding to the potential of failure within dual clutch 60 is residual heat from heat transfer 65a that has not fully dissipated after clutch disc 66a and pressure plate 61 disengage. This build-up of residual heat could eventually lead to fatigue of friction lining 64a', 64a", 64b', and 64b" and potentially cause an engagement failure of dual clutch 60, leading to loss of control of the operated vehicle.

Figure 6B:
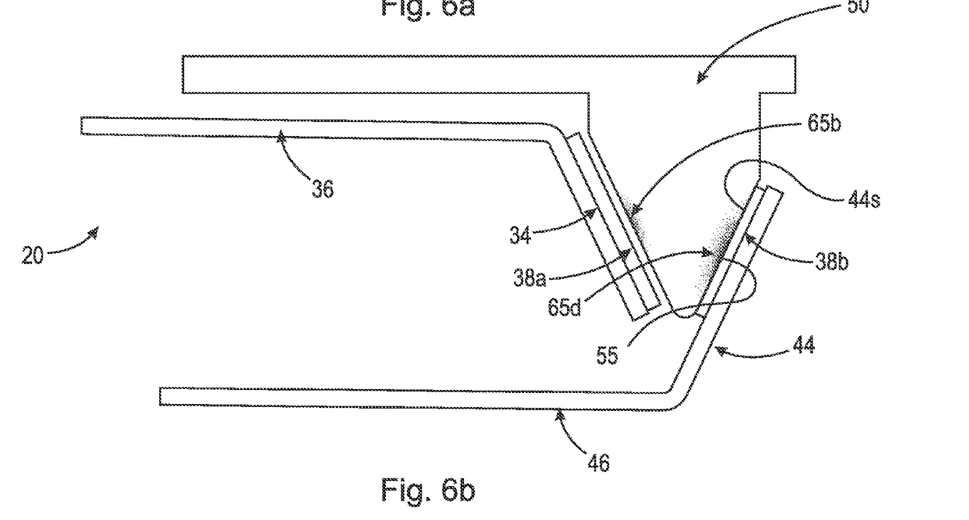

An enlarged cross-sectional view of dual clutch 20 is shown in FIG. 6b utilizing FEA. As shown in the figure, second contact member 44 engages flywheel 50 along surface 44s and outer conical surface 55 as second clutch disc 46 axially moves towards flywheel 50. During operation, heat transfer 65d illustrates the generation of heat between second contact member 44 and flywheel 50 in a lesser amount when compared to heat transfer 65c (shown in FIG. 6a). The residual heat left from heat transfer 65b when first contact member 34 disengages flywheel 50 is in a lesser amount than the residual heat of heat transfer 65a (shown in FIG. 6a). This increase of heat dissipation due to the engagement properties of flywheel 50 with clutch disc 36 and clutch disc 46 greatly increase operating performance of dual clutch 20 and decreases unnecessary wear of friction lining 38a and friction lining 38b, therefore increasing the operating life of clutch disc 36 and clutch disc 46.

In order for the mechanisms within traditional dual clutch 60 to handle the heat energy generated from the engaging and disengaging of clutch disc 66a and clutch disc 66b, pressure plate 61, various counter pressure plates (not shown), and a flywheel (not shown) engaged with pressure plate 61 must be made from cast iron. Due to the unique shape of flywheel 50, the only component of dual clutch 20 that is required to have superior heat capacity is flywheel 50. The manufacturing process of flywheel 50 will be similar if not the same to that of a traditional flywheel, such as a casting and machining process. In addition, dual clutch 20 has eliminated pressure plates and counter pressure plates by utilizing the rotational forces generated while dual clutch 20 is in operation and engaging flywheel 50 directly with first clutch disc 36 and second clutch disk 46.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 1 longitudinal axis
2 radius
3 circumference
4 object
5 object
6 object
7 surface
8 surface
9 surface
10 system
11 axial surface
12 radial surface
13 surface
15 object
20 dual clutch
22 engine output shaft
24 first transmission input shaft
26 second transmission input shaft
28 first clutch
30 second clutch
34 first contact member
34s surface
35 bearing
36 first clutch disc
38a inner friction lining
38b outer friction lining
40 first actuation means
41 second actuation means
44 second contact member
44s surface
46 second clutch disc
50 flywheel
51 mounting bolt
52 aperture
53 aperture
55 outer conical surface
56 inner conical surface
47 cone angle
58 base
58a first side
58b second side
60 dual clutch
61 pressure plate
62 actuator member
63 actuator member
64a' friction lining
64a" friction lining
64b' friction lining
64b" friction lining
65a heat transfer representation
65b heat transfer representation
65c heat transfer representation
65d heat transfer representation
66a clutch disc
66b clutch disc
67a surface
67b surface
67c surface
67d surface
70 clutch housing

What is claimed is:

1. A dual clutch assembly for engaging an engine with a first or second transmission input shaft comprising:
a flywheel comprising an inner conical surface and an outer conical surface;
a first clutch comprising:
a first conical clutch disc arranged for connection to said first transmission input shaft; and,
a first contact member slidable along an axis relative to said first and second input shafts for engaging said first conical clutch disc with said flywheel inner conical surface; and,
a second clutch comprising:
a second conical clutch disc arranged for connection to said second transmission input-shaft; and,
a second contact member slidable along said axis for engaging said second conical clutch disc with said flywheel outer conical surface.

2. The dual clutch assembly recited in claim 1, wherein said first contact member and said second contact member form a frusto-conical member.

3. The dual clutch assembly recited in claim 2, wherein said frusto-conical member has an approximate cone angle of 50 degrees.

4. The dual clutch assembly recited in claim 2, wherein said frusto-conical member has an approximate cone angle in the range of 30 to 60 degrees.

5. The dual clutch assembly recited in claim 2, wherein said first contact member and said second contact member are substantially covered with a friction lining and between said second contact member and said flywheel.

6. The dual clutch assembly recited in claim 1, wherein an actuation means is an electric motor.

7. The dual clutch assembly recited in claim 1, wherein an actuation means is a hydraulic motor.

8. The dual clutch assembly recited in claim 1, wherein said first conical clutch disc and said second conical clutch disc are operatively arranged to engage said flywheel.

9. The dual clutch assembly recited in claim 8, wherein said first conical clutch disc and said second conical clutch disk are non-rotatably engaged with said first transmission input shaft and said second transmission input shaft via a splined shaft.

10. The dual clutch assembly recited in claim 8, wherein said first conical clutch disc and said second conical clutch disk are non-rotatably engaged with said first transmission input shaft and said second transmission input shaft via a welded shaft.

11. A dual clutch assembly for engaging an engine with a first or second transmission input-shaft comprising:
a flywheel comprising an inner conical surface and an outer conical surface;
a first clutch comprising:
a first conical clutch disc arranged for connection to said first transmission input shaft; and, a first contact member slidable along an axis relative to said first and second input shafts for engaging said first conical clutch disc with said flywheel inner conical surface; and, a second clutch comprising:

a second conical clutch disc arranged for connection to said second transmission input shaft; and, a second contact member slidable along said axis for engaging said second conical clutch disc with said flywheel outer conical surface; and, an actuator operatively arranged to move said first clutch and said second clutch along said axis.

* * * * *